United States Patent [19]

Schechter

[11] Patent Number: 5,419,301
[45] Date of Patent: May 30, 1995

[54] ADAPTIVE CONTROL OF CAMLESS VALVETRAIN

[75] Inventor: Michael M. Schechter, Farmington Hills, Mich.

[73] Assignee: Ford Motor Company, Dearborn, Mich.

[21] Appl. No.: 227,825

[22] Filed: Apr. 14, 1994

[51] Int. Cl.6 .............................................. F01L 9/02
[52] U.S. Cl. .................................. 123/673; 123/90.13
[58] Field of Search ................... 123/673, 90.13, 90.14, 123/90.15, 90.16

[56] References Cited

U.S. PATENT DOCUMENTS

| | | | |
|---|---|---|---|
| 4,000,756 | 1/1977 | Ule et al. | 137/596.17 |
| 4,009,695 | 3/1977 | Ule | 123/90.13 |
| 4,206,728 | 6/1980 | Trenne | 123/90.12 |
| 4,615,306 | 10/1986 | Wakeman | 123/90.16 |
| 4,674,451 | 6/1987 | Rembold et al. | 123/90.16 |
| 4,696,265 | 9/1987 | Nohira | 123/90.16 |
| 4,716,863 | 1/1988 | Pruzan | 123/90.15 |
| 4,796,573 | 1/1989 | Wakeman et al. | 123/90.16 |
| 4,930,465 | 6/1990 | Wakeman et al. | 123/90.12 |
| 5,115,782 | 5/1992 | Klinke et al. | 123/673 |
| 5,275,136 | 1/1994 | Schechter et al. | 123/90.12 |
| 5,293,741 | 3/1994 | Kashiyama et al. | 123/90.15 |
| 5,363,816 | 11/1994 | Yorita et al. | 123/90.13 |
| 5,377,654 | 1/1995 | LoRusso et al. | 123/673 |

Primary Examiner—Raymond A. Nelli
Attorney, Agent, or Firm—Donald A. Wilkinson; Roger L. May

[57] ABSTRACT

A variable camless engine valve control system and method of control wherein each of the reciprocating intake and/or exhaust valves (10) is hydraulically controlled and includes a piston (26) subjected to fluid pressure acting on surfaces at both ends of the piston (26), is connected to a source of high pressure fluid (40) in one volume (27) while the volume (25) at the other end is connected to a source of high pressure fluid (40) and a source of low pressure fluid (42), and disconnected from each through action of controlling means such as a computer (74) controlling solenoid valves (64, 68). Optimum intake air and residual gas quantities in each engine cylinder having the aforementioned variable valve control system is assured by controlling electric pulses of variable duration and timing. The pulse timing and duration are calculated based upon values in permanent memory of the computer (74) corresponding to information obtained from sensors and correction values from a correction memory corresponding to feedback from other sensors.

6 Claims, 3 Drawing Sheets

ADAPTIVE CONTROL OF CAMLESS VALVETRAIN

FIELD OF THE INVENTION

The present invention relates to a system for variably controlling internal combustion engine intake and exhaust valves. More specifically, it relates to an apparatus and control method for a camless engine valve system for variably controlling the lift schedule of engine valves.

BACKGROUND OF THE INVENTION

Conventional automotive internal combustion engines operate with one or more camshafts controlling the engine valves, i.e., intake and exhaust valves, according to a predetermined lift schedule. With this type of mechanical structure, the lift schedule is fixed. A fixed lift schedule, however, will not allow for optimum engine performance since in general different engine operating conditions require different optimum lift schedules.

The enhancement of engine performance obtainable by varying the timing and lift as well as the acceleration, velocity and travel time of the intake and exhaust valves in an internal combustion engine is generally appreciated in the art. Nonetheless, the technology for providing a straight-forward, relatively inexpensive and highly reliable system has not been forthcoming. Increased use and reliance on microprocessor control systems for automotive vehicles and increased confidence in hydraulic as opposed to mechanical systems is now making substantial progress in engine valvetrain design possible.

There are several reasons why a generally fixed lift schedule is not optimum. Control of gas exchange in a conventional engine with cam driven valves is limited and cannot be optimized for all engine operating conditions. Control of gas exchange, however, in a camless engine is fundamentally different. In an engine with a conventional mechanical valvetrain, with its fixed valve timing, the intake air flow is controlled by air throttling, which results in throttling losses. Further, the amount of residual exhaust gas retained in the cylinder cannot be controlled by a mechanical valvetrain, thereby requiring the addition of recirculated exhaust gas to the intake air by an external exhaust gas recirculation (EGR) system in order to reduce nitrogen oxide emissions.

The latter limitation is also a concern with engines having lost motion engine valve systems connected between camshafts and engine valves, since they are still limited somewhat by the inflexibility of a camshaft. Lost motion control systems can control the amount of lift, but are very limited in controlling the timing of valve opening and closing, thus limiting their ability to control the residual gas content in a cylinder. Further, a camless electrohydraulic system has the advantage of completely eliminating the cost and weight of camshafts while providing increased flexibility in the timing and amount of opening of each engine valve. In general, variation of the timing of engine valve opening and closing is preferred, rather than controlling the lift only, to determine the amount of air that is inducted into a cylinder.

In an engine with an electrohydraulic camless valvetrain, the engine valve events are flexible. The quantities of intake air and residual exhaust gas in each cylinder can be controlled by varying the timing of opening and/or closing for the intake and exhaust valves, which eliminates the need for intake air throttling and an external EGR system. On the other hand, while an electrohydraulic camless valvetrain provides more flexibility to enhance engine performance, there can be drawbacks not encountered with systems employing mechanical camshafts.

For all of the inflexibility and inefficiency associated with a mechanical valvetrain, it has one major advantage: the accuracy with which a camshaft can be ground is such that a reasonably good cylinder-to-cylinder air distribution is inherently assured. In the case of an engine with a camless valvetrain, equal distribution of air and residual gas among cylinders is not inherent. While a lost motion type of system may not have as great of an inherent variation as a camless system, due to the fact that it is still driven by mechanical camshaft, it still has other disadvantages as noted above.

In a camless valvetrain system, instead of an air throttle and an external exhaust gas recirculation system, changes in the timing of control valves can be used to control the amount of air inducted into and the amount of residual gas retained in the combustion chamber. The engine valves can be electrically controlled by these control valves, such as solenoid valves, which respond to electric control signals from an on-board computer. To assure that the actions of the intake and exhaust valves in all cylinders are substantially equal, substantially identical performance of respective control valves in all cylinders must by achieved, which is a challenging task.

A camless valvetrain can accomplish both proper intake air and exhaust gas distribution among cylinders combined with the elimination of exhaust gas recirculation in order to provide a complete engine optimization package. The need, then, arises to ensure that the system can accomplish the optimization continually while operating, as well as correct for any variations that tend to be inherent in this type of system.

The timing and duration of the voltage signals that activate the control valves can be controlled with great accuracy and uniformity. Unfortunately, this does not translate into uniformity of control valve performance. Individual control valves tend to respond differently to identical voltage signals, due to inevitable minor differences in their physical systems. To achieve substantially identical performance by all control valves requires a set of control signals, each individually tailored to the needs of the specific control valve that it controls.

This control is required to assure substantially even distribution of intake air and residual gas from cylinder-to-cylinder due to this inherent control valve-to-control valve variability. In addition, system sensitivity to changing ambient conditions, to gradual deterioration in performance of individual components and in quality of the working fluid can further contribute to deviation from the required performance.

Tightening up manufacturing tolerances and applying post-manufacturing adjustments can reduce, but not totally eliminate, the control-valve-to-control-valve differences. Further, this does not resolve the problem of possible changes in control valve performance and quality of working fluid over time. This inherent variability creates the need for a camless valvetrain system that has an adaptive control system continuously monitoring the results of its performance under various engine operating conditions and which adjusts the system to account for the system tolerances to assure correct and equal distribution of intake air and residual gas among the cylinders at all times.

Thus, a control system is needed that accounts for various engine operating conditions by changing the valve event of each engine valve based on values of required intake air and residual gas quantities placed in a computer memory and which has a feedback loop that monitors the actual air and residual gas quantity independently for each engine cylinder to create a correction memory that corrects for deviation from the required parameters in each cylinder for the various engine operating conditions. This will allow engine optimization for best fuel economy, emissions and torque as well as for best idle quality.

SUMMARY OF THE INVENTION

In its embodiments, the present invention contemplates a method of individually controlling engine valve opening and closing in a multi-cylinder internal combustion engine having a camless valvetrain with variable engine valve events. The method comprises sensing engine crankshaft rotational position and speed and engine torque demand and producing a corresponding position and speed signal and a corresponding torque demand signal; reading the position and speed signal and the torque demand signal into an on-board computer; determining a desired quantity of intake air and residual gas for each cylinder; for each cylinder, determining a corresponding nominal value of timing and duration of an activation signal to send to each of a plurality of high pressure and low pressure solenoid valves; reading correction values for the timing of the activation signal for each of the low pressure solenoid valves from a correction memory in the on-board computer; adding the correction values to the nominal values of timing for each of the low pressure solenoid valves to produce corrected values in corrected activation signals; activating each of the high pressure solenoid valves with the nominal activation signals and each of the low pressure solenoid valves with the corrected activation signals; monitoring the actual quantities of intake air and residual gas contained in each cylinder; comparing the actual quantities of intake air and residual gas for each cylinder to the corresponding desired amount of intake air and residual gas; determining a correction increment for each cylinder; and modifying the correction values in the correction memory of the on-board computer with a correction increment.

The present invention further contemplates a hydraulically operated camless valve control system for at least one intake and at least one exhaust valve in a cylinder within an internal combustion engine. The system comprises a high pressure source of fluid, a low pressure source of fluid and a cylinder head member adapted to be affixed to the engine and including at least one enclosed intake valve bore and chamber and at least one exhaust valve bore and chamber, the intake and exhaust valves each being shiftable between a first and a second position within the respective cylinder head bores and chambers. The intake and exhaust valves each have a valve piston coupled thereto and slidable within its respective enclosed chamber which thereby forms a first and a second cavity that vary in displacement as the respective intake or exhaust valve moves. The cylinder head member has high pressure ports extending between the first and second cavities and the high pressure source of fluid, and low pressure ports extending between the first cavities and the low pressure source of fluid. The intake and the exhaust valve each have an associated high pressure valve and an associated low pressure valve, respectively, to regulate the flow of fluid in their respective first cavities. A control means cooperates with the high and low pressure valves for selectively coupling the first cavities to the high pressure and the low pressure source to oscillate the intake and exhaust valves in timed relation to engine operation. A first correction means cooperates with the control means for correcting the timing of the coupling of the first cavity, associated with the intake valve, to the low pressure source, and a second correction means cooperates with the control means for correcting the timing of the coupling of the first cavity, associated with the exhaust valve, to the low pressure source.

Accordingly, an object of the present invention is to provide a camless engine with an electrohydraulically controlled valvetrain that optimizes engine performance under various engine operating conditions while eliminating the need for air throttling and external exhaust gas recirculation and which maintains substantially identical performance of the intake valves and the exhaust valves in order to maintain equal amounts of intake air and residual gas between the cylinders.

An advantage of the present invention is the ability to operate a camless valvetrain that has the cost and weight advantage arising from the complete elimination of a camshaft as well as air throttling and external EGR, while improving engine performance for various engine operating conditions by providing an adaptive control system that accounts for variations between valves in the system.

A further advantage to this adaptive control is that it can properly activate the intake and exhaust valves using nominal activation values for the timing and duration of the high pressure solenoids and for the duration of the low pressure solenoid valves, while only needing to use corrected activation values for the timing of the low pressure solenoid valve activation associated with the intake valve in order to assure the proper distribution of intake air among the cylinders and while only needing to use corrected activation values for the timing of the low pressure solenoid valve associated with the exhaust valve to assure proper distribution of residual gas among the cylinders.

DETAILED DESCRIPTION OF THE PREFERRED EMBODIMENTS

Camless engine valvetrains increase the flexibility in both valve timing and lift, even over those systems employing lost motion types of electrohydraulic systems, which allow somewhat more flexibility than a conventional camshaft driven valvetrain. An electrohydraulic camless valvetrain is shown in detail in U.S. Pat. No. 5,255,641 to Schechter (assigned to the assignee of this invention), which is incorporated herein by reference.

Figure 1:
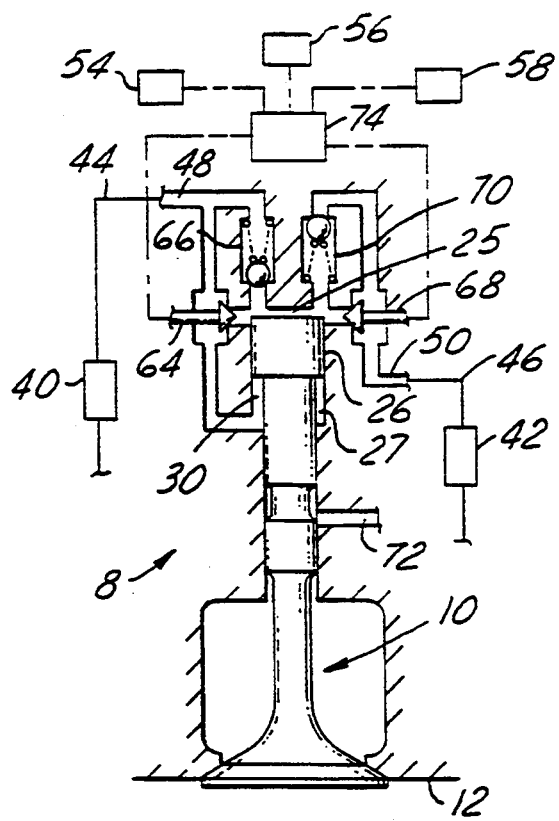
FIG. 1 is a schematic diagram showing a single hydraulically controlled engine valve and the hydraulic system for supplying fluid to the valve control in accordance with the present invention.

FIG. 1 shows a single engine valve assembly 8 of an electrohydraulically controlled valvetrain. An engine valve 10, for inlet air or exhaust as the case may be, is located within a cylinder head 12. A valve piston 26, fixed to the top of the engine valve 10, is slidable within the limits of a piston chamber 30.

Fluid is selectively supplied to volume 25 above piston 26 from a high pressure oil source 40 and a low pressure oil source 42 hydraulically connected through a high pressure line 44 and a low pressure line 46, respectively, to a high pressure port 48 and a low pressure port 50, respectively.

Volume 25 can be connected to high pressure oil source 40 through a solenoid valve 64 or a check valve 66, or to low pressure oil source 42 through a solenoid valve 68 or a check valve 70. A volume 27 below piston 26 is always connected to high pressure oil source 40. A fluid return outlet 72 provides a means for returning to a sump (not shown) any fluid that leaks out of piston chamber 30. High pressure solenoid valve 64 and low pressure solenoid valve 68 are activated and deactivated by signals from an on-board computer 74. On-board computer 74 is electrically connected to a torque demand sensor 54 and an engine speed and position sensor 56. It is also electrically connected to feedback sensors 58 for determining the actual quantities of intake air and residual gas in each engine cylinder.

During engine valve opening, high pressure solenoid valve 64 opens and the net pressure force acting on piston 26 accelerates engine valve 10 downward. When high pressure solenoid valve 64 closes, pressure above piston 26 drops, and piston 26 decelerates pushing the fluid from volume 27 below it back into high pressure oil source 40. Low pressure fluid flowing through low pressure check valve 70 prevents void formation in volume 25 during deceleration. When the downward motion of engine valve 10 stops, low pressure check valve 70 closes and engine valve 10 remains locked in its open position.

The process of valve closing is similar, in principle, to that of valve opening. Low pressure solenoid valve 68 opens, the pressure above piston 26 drops and the net pressure force acting on piston 26 accelerates engine valve 10 upward. When low pressure solenoid valve 68 closes, pressure above piston 26 rises, and piston 26 decelerates pushing the fluid from volume 25 through high-pressure check valve 66 back into high-pressure oil source 40.

Figure 3A:
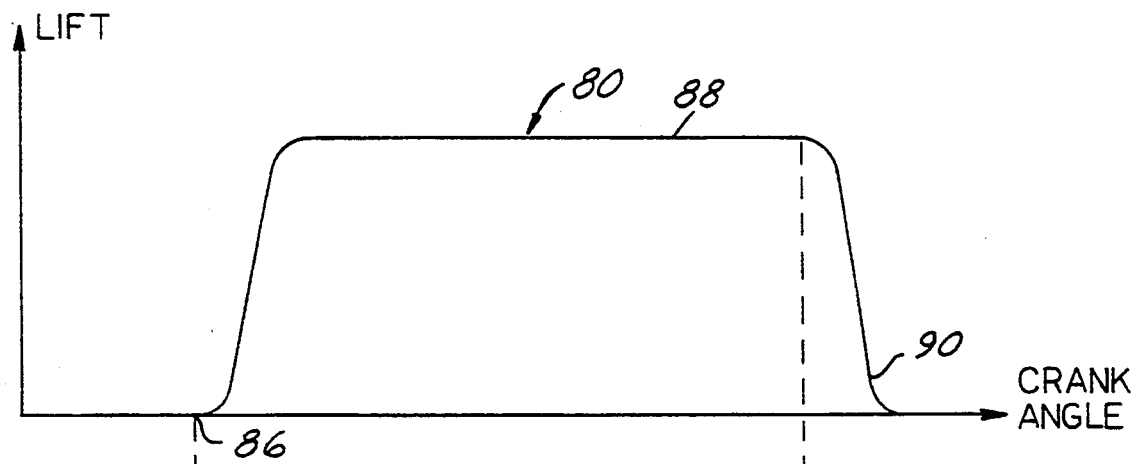
FIGS. 3A and 3B show graphs of solenoid valve lift and corresponding engine valve lift relative to engine crank angle in accordance with the present invention.
Figure 3B:
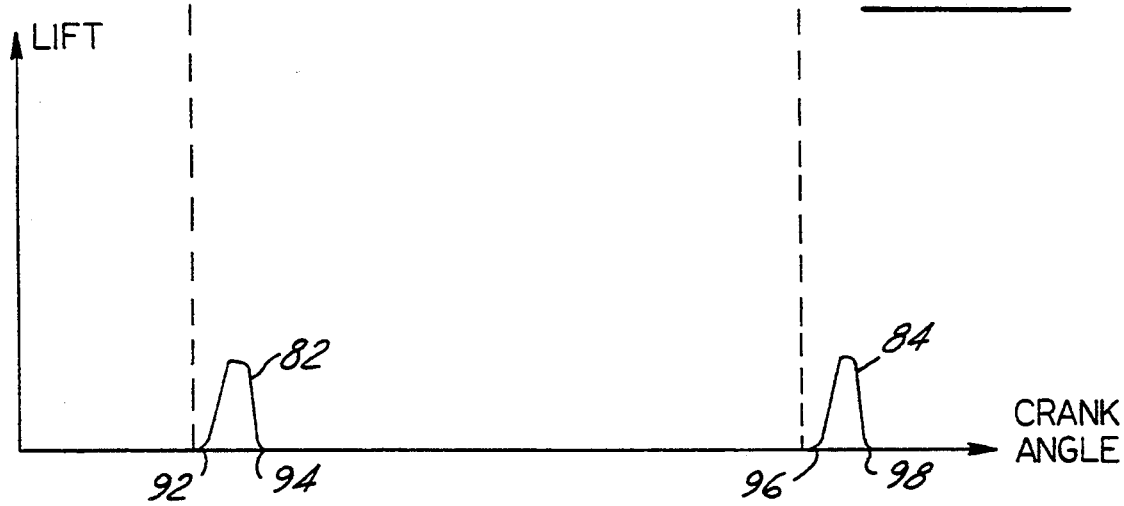

FIGS. 3A and 3B further illustrate the relationship between solenoid valve activation an engine valve lift. FIG. 3A shows a diagram of engine valve lift 80 versus engine crank angle and FIG. 3B shows a corresponding diagram of high and low pressure solenoid valve lifts, 82 and 84 respectively, versus engine crank angle. Engine valve opening 86 is controlled by high-pressure solenoid valve 64 (FIG. 1). When high pressure solenoid valve opening 92 occurs, this causes engine valve opening 86 to begin. When high pressure solenoid valve closing 94 occurs, this causes engine valve deceleration. Engine valve 10 then remains in an open position 88. Opening 96 and closing 98 of low pressure solenoid valve 68 controls engine valve closing 90, similar to engine valve opening.

As can be seen from FIGS. 3A and 3B, the timing of engine valve closure 90 is determined by the timing of low-pressure solenoid valve lift 84, which corresponds to a solenoid voltage pulse from an on-board computer 74 (FIG. 1) that activates low pressure solenoid valve 68. Varying the timing of activation of high-pressure solenoid valve 64 and low-pressure solenoid valve 68, then, varies the timing of the engine valve opening and closing, respectively. The amount of engine valve lift is controlled by varying the duration of the solenoid voltage pulse to high pressure solenoid valve 64 and low pressure solenoid valve 68.

With the ability to control the amount and timing of engine valve opening and closing, engine operation can be optimized for various engine operating conditions. FIGS. 2A–2D show four circular diagrams which illustrate optimum duration and timing of intake and exhaust events for different engine operating conditions. The flexibility of a camless valvetrain system allows for the control of the timing and amount of valve lift to accomplish the various optimum lift schedules. A mechanical camshaft driven valvetrain, with or without a lost motion system, could not accommodate all of these different lift schedules.

Figure 2A:
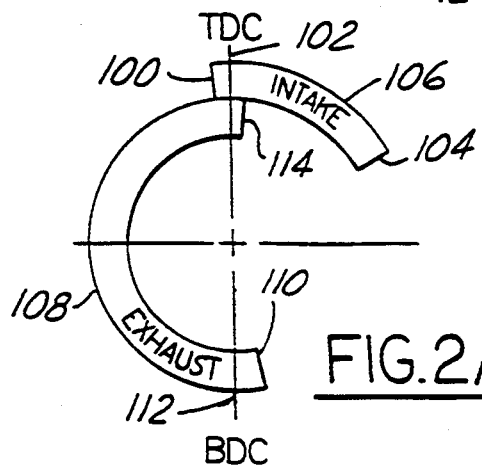
FIGS. 2A–2D show optimum engine valve lift and timing diagrams for different engine operating conditions in accordance with the present invention.

As shown in FIG. 2A, during an engine idle condition, it is desired to have overlap, between the intake and exhaust valve open conditions within a given cylinder, small in order to minimize the residual gas fraction. Intake valve opening 100 begins just prior to piston top dead center (TDC) 102 and closing 104 is shortly after TDC 102. This air intake event 106 is short, in order to trap only a small volume of air in the cylinder, thus avoiding the need for air throttling. The exhaust event 108 begins at exhaust opening 110 just prior to bottom dead center (BDC) 112 and closes 114 just after TDC 102.

Figure 2B:
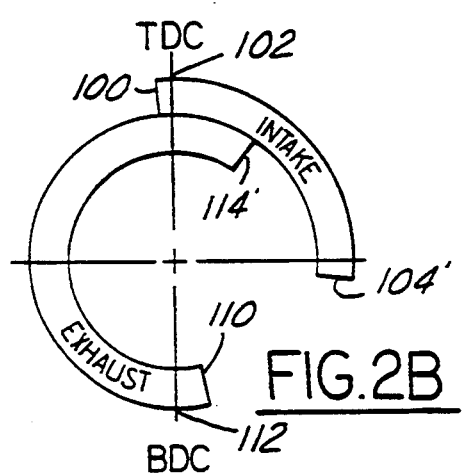

FIG. 2B shows the desired engine valve timing for optimum engine performance at a condition of light engine load. The timing of intake opening 100 and exhaust opening 110 are the same as the engine idle condition. However, the exhaust valve closure 114' is retarded to increase the valve overlap and thus increase the residual gas quantity, which helps to control nitrogen oxide emissions, thus avoiding the need for an external EGR system. The timing of the intake engine valve closure 104' is also adjusted in order to trap a somewhat greater quantity of intake air in the cylinder than at engine idle. Since this condition also does not need maximum intake air, the camless valvetrain control avoids the need for air throttling under this condition also. Here, the prime symbol used on the numbers represents a different timing, of the particular event being discussed, from the engine idle operating condition.

Figure 2C:
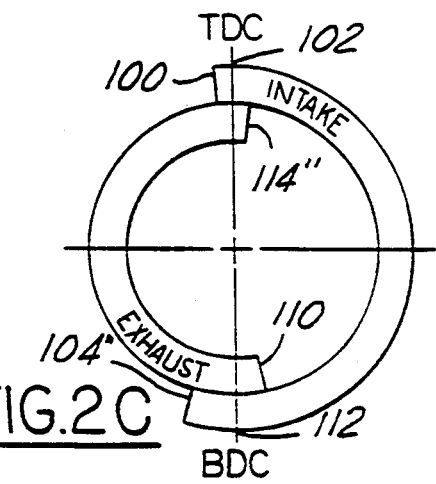
Figure 2D:
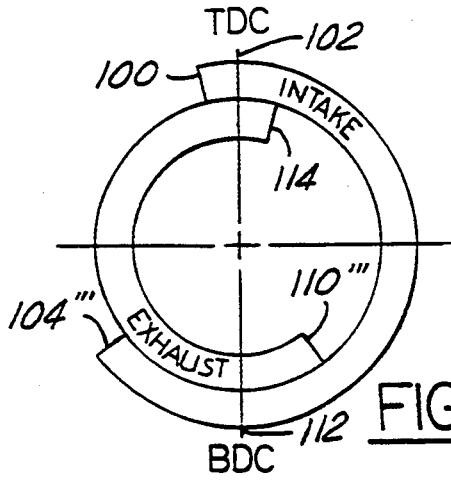

As shown in FIG. 2C, during an engine heavy load and low speed condition, it is desired to have the valve opening overlap reduced further by exhaust valve closure 114" taking place immediately after piston TDC 102. It is further desired to have the intake valve closure 104" after piston BDC 112 to maximize the quantity of intake air trapped in the cylinder. At an engine condition of heavy load and high speed, as shown in the curves of FIG. 2D, the timing of the intake valve closure 104''' is significantly past BDC 112 and the exhaust valve opening 110''' is significantly ahead of BDC 112 to take advantage of an intake air ram charging effect.

It is clear from the diagrams in FIGS. 2A–2D that the quantities of intake air and residual gas in the cylinder can be controlled by varying the respective timings of the intake and exhaust valve closures, 104 and 114 respectively, to optimize engine performance for various conditions. This timing can be accomplished by varying the timing of the respective solenoid voltage signals to the low pressure solenoid valves as shown in FIGS. 3A and 3B. Thus, only the timing of the intake and exhaust valve closures are critical to determining the quantity of intake air and residual gas in a particular cylinder.

Figure 4:
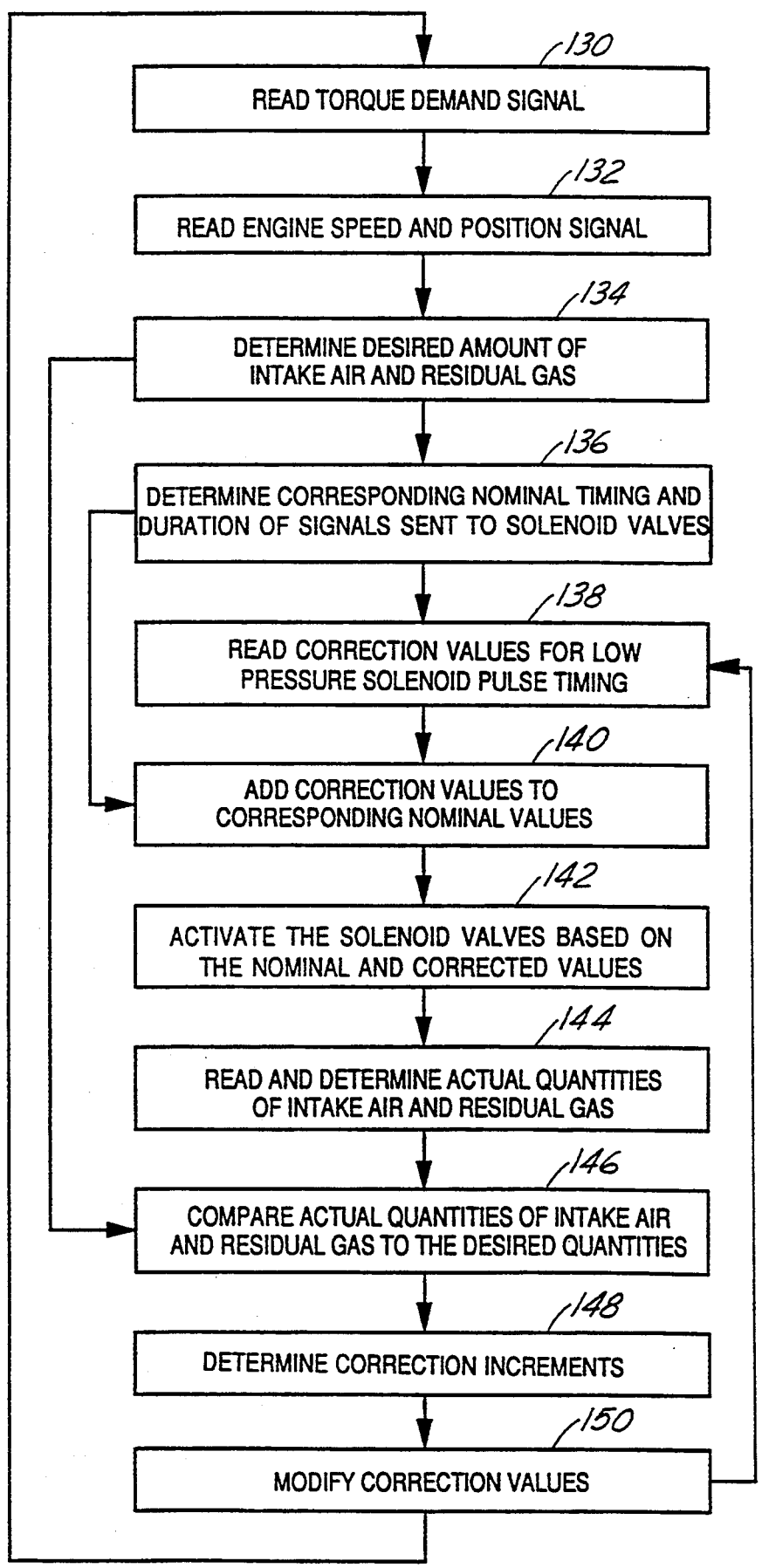
FIG. 4 shows a flow diagram of the steps required to control the timing of solenoid valves which control the opening and closing of the engine valves in accordance with the present invention.

The process of adaptive control of the camless valve system, to control engine valve operation and to assure uniformity and correctness of intake air and residual gas distribution among the cylinders can be explained with greater detail with an example of the air flow and residual gas control for one of the engine cylinders and is illustrated in FIG. 4, with reference to FIG. 1. A first basic control signal is an engine torque demand signal, which is supplied by torque demand sensor 54, typically monitoring accelerator pedal position. A second control signal is one that includes the engine speed and crankshaft position, supplied by engine speed and position sensor 56 that typically measures the rate of change of the crank angle. On-board computer 74 reads torque demand signal 130 and reads engine speed and crankshaft position signal 132.

Memory in on-board computer 74 contains information for optimum engine performance based upon the control signals. On the basis of these signals, and using the information contained in the memory of on-board computer 74, on-board computer 74 determines the quantities of intake air and residual gas 134 desired in each cylinder for optimum engine performance. On-board computer 74 also contains a memory table in which, for each value of torque and engine speed, the required timing, lift and duration of intake and exhaust valve opening is specified. These quantities are converted into the nominal timing and duration of the electric pulse signals 136 that are sent to high pressure and low pressure solenoid valves, 64 and 68 respectively, to activate them. The information needed for this conversion is contained in algorithms stored in another memory table in on-board computer 74.

The memory containing the information on the low pressure solenoid pulse timing consists of two parts. The first, as described above, is a basic permanent memory containing nominal pulse timing data, each representing an empirically established statistical average of the required pulse timing for the particular engine. A second part is a correction memory, which contains pulse timing increments to be added to or subtracted from the values in the basic permanent memory. On-board computer 74 reads the correction values for low pressure solenoid valve pulse timing 138. The initial values in the correction memory in a new engine are equal to zero. This allows the engine to have a starting point and to calibrate and tune itself as it operates. The values in the correction memory are added to the nominal values 140.

The numbers in the correction memory can be changed during engine operation as needed to assure equal intake air flow and residual gas content among the cylinders. There is a separate correction memory in on-board computer 74 for each engine cylinder to correct individually for tolerances between valves causing unequal distribution of intake air and residual gas between cylinders.

The system reads the basic timing signal from permanent memory 136, adds to it the correction signal 138 from the correction memory 140 for the specific cylinder and thus establishes the value of the timing of low pressure solenoid valve 68 activation for this valve, intake or exhaust as the case may be, under these operating conditions in order to optimize engine operation. The values of the pulse duration for the low pressure solenoid valve and the pulse duration and timing for the high pressure solenoid valve remain at a nominal value since they are not needed to determine quantities of intake air and residual gas. The nominal and corrected signals are sent from on-board computer 74 to the high and low pressure solenoid valves 64 and 68 to activate them 142, which in turn, activates the intake or exhaust valve 10, as the case may be. The system also includes a set of sensors which supply information permitting the engine controller to read and determine the actual quantities of intake air and residual gas in each cylinder during each cycle 144.

Evaluating the actual quantities of intake air and residual gas in each cylinder can be done in a variety of ways. For example, the intake air quantities can be measured by mass air flow sensors installed in individual intake runners. Another method could involve computing the air quantities from the values of the air-to-fuel ratios measured by using oxygen sensors installed within individual exhaust runners. Alternatively, a single mass air flow sensor in the intake air stream and/or a single oxygen sensor in the exhaust stream can be used on a time-resolved basis to calculate individual intake air values within each cylinder. With air quantity known, the residual gas fraction can be determined by measuring the pressure and temperature in the cylinder at a specific reference piston position, such as for example at piston bottom dead center.

On-board computer 74 compares the actual quantities of intake air and residual gas inducted into each cylinder to the desired ones 146 to determine the amount of system error and generate separate correction increments for low pressure solenoid valve pulse timing 148 in each cylinder. An error in the amount of intake air in the particular cylinder will require a correction in the timing of the low pressure solenoid associated with the intake valve in that cylinder while an error in the residual gas in that cylinder will require a correction in the timing of the low pressure solenoid associated with the exhaust valve in that cylinder. Whenever a discrepancy exists, the correction memory in on-board computer 74 is modified 150 for that cylinder at the given engine torque and speed combination until, after several cycles, the actual quantities at this torque and speed substantially equal the required ones. The magnitude of the correction increment is directly proportional to the system error and inversely proportional to the engine speed. As a result of this, the timing of the solenoid is retarded and the quantity is increased if the system error is positive. Conversely, the timing of the solenoid is advanced and the quantity is reduced if the error is negative.

Regardless of any initial discrepancies between the actual and required quantities of intake air and residual gas, on-board computer 74 of a running engine will quickly fill its correction memory with data that will assure proper composition of the charge in each engine cylinder at all engine speeds and loads. Moreover, the system will continue to monitor the engine operation and make corrections at regular intervals in order to compensate for changes in working fluid properties as well as for any sudden or gradual deterioration in solenoid valve performance, thus assuring optimum and substantially equal intake air and residual gas quantities between all cylinders under all operating conditions.

In an alternative embodiment, sequential fuel injection is also controlled by on-board computer 74 similar to the control of the engine valves, except that the controlled variable is the fuel injector pulse duration instead of the solenoid pulse duration. The nominal fuel quantities needed are determined from correlating sensor information with values stored in a memory in on-board computer 74. The actual fuel quantities are computed from the values of the air-to-fuel ratios measured by oxygen sensors installed in individual exhaust runners, or by measuring the acceleration pulses of an engine flywheel generated by individual cylinders. Correction values are then determined and are used to adjust a separate correction memory, which is added to the nominal values to determine the individual fuel injector pulse width needed for each cylinder.

While certain embodiments for carrying out the present invention have been described in detail, those familiar with the art to which this invention relates will recognize various alternative designs and embodiments for practicing the invention as defined by the following claims.

I claim:

1. A method of individually controlling engine valve opening and closing in a multi-cylinder internal combustion engine having a camless valvetrain with variable engine valve events comprising:
   sensing engine rotational position and speed and engine torque demand and producing a corresponding position and speed signal and a corresponding torque demand signal;
   reading the position and speed signal and the torque demand signal into an on-board computer;
   determining a desired quantity of intake air and residual gas for each cylinder;
   for each cylinder, determining a corresponding nominal value of timing and duration of an activation signal to send to each of a plurality of high pressure and low pressure solenoid valves;
   reading correction values for the timing of the activation signal for each of the low pressure solenoid valves from a correction memory in the on-board computer;
   adding the correction values to the nominal values of timing for each of the low pressure solenoid valves to produce corrected values in corrected activation signals;
   activating each of the high pressure solenoid valves with the nominal activation signals and each of the low pressure solenoid valves with the corrected activation signals;
   monitoring the actual quantities of intake air and residual gas contained in each cylinder;
   comparing the actual quantities of intake air and residual gas for each cylinder to the corresponding desired amount of intake air and residual gas;
   determining correction increments for each cylinder; and
   modifying the correction values in the correction memory of the on-board computer with the correction increments.

2. A method according to claim 1 wherein the step of monitoring the actual quantities of intake air and residual gas comprises:
   sensing mass air flow of intake air quantities within individual intake runners;
   measuring pressure and temperature in each cylinder at a specific reference piston position; and
   calculating the residual gas quantities in each cylinder.

3. A method according to claim 1 wherein the step of monitoring the actual quantities of air and residual gas comprises:
   sensing the air-to-fuel ratios in individual exhaust runners with oxygen sensors installed in the exhaust runners;
   calculating the intake air quantity in each cylinder;
   measuring pressure and temperature in each cylinder at a specific reference piston position; and
   calculating the residual gas quantity in each cylinder.

4. A hydraulically operated camless valve control system for at least one intake valve and at least one exhaust valve in a cylinder within an internal combustion engine, the system comprising:
   a high pressure source of fluid and a low pressure source of fluid;
   a cylinder head member adapted to be affixed to the engine and including at least one enclosed intake valve bore and chamber and at least one exhaust valve bore and chamber, the intake and exhaust valves each shiftable between a first and second position within their respective cylinder head bores and chambers;
   the intake and exhaust valves each having a valve piston coupled thereto and slidable within its respective enclosed chamber, each of which thereby forms a first and a second cavity that vary in displacement as the respective intake or exhaust valve moves;
   the cylinder head member having high pressure ports extending between the first and second cavities and the high pressure source of fluid, and low pressure ports extending between the first cavities and the low pressure source of fluid;
   the intake valve and the exhaust valve each having an associated high pressure valve and an associated low pressure valve for respectively regulating the flow of fluid in their respective first cavities;
   control means cooperating with the high and low pressure valves for selectively coupling the first cavities to the high pressure and the low pressure source to oscillate the intake and exhaust valves in timed relation to engine operation;
   first correction means cooperating with the control means for correcting the timing of the coupling of the first cavity, associated with the intake valve, to the low pressure source; and
   a second correction means cooperating with the control means for correcting the timing of the coupling of the first cavity, associated with the exhaust valve, to the low pressure source.

5. A camless valve control system according to claim 4 further comprising feedback sensing means for determining if the intake and exhaust valves are oscillating in a proper timed relation to engine operation such that proper quantities of intake air and residual gas are being supplied to each engine cylinder.

6. A hydraulically operated camless valve control system for individually controlling variably lift engine valves in a multi-cylinder internal combustion engine, the system comprising:

sensing means for sensing engine rotational position and speed and engine torque demand and producing a corresponding position and speed signal and a corresponding torque demand signal;

means for reading the position and speed signal and the torque demand signal into an on-board computer;

means for determining a desired quantity of intake air and residual gas for each cylinder;

means, associated with each cylinder, for determining a corresponding nominal value of timing and duration of an activation signal to send to each of a plurality of high pressure and low pressure solenoid valves;

means for reading correction values for the timing of the activation signal for each of the low pressure solenoid valves from a correction memory in the on-board computer;

means for adding the correction values to the nominal values of timing for each of the low pressure solenoid valves to produce corrected values in corrected activation signals;

means for activating each of the high pressure solenoid valves with the nominal activation signals and each of the low pressure solenoid valves with the corrected activation signals;

means for monitoring the actual quantities of intake air and residual gas contained in each cylinder;

means for comparing the actual quantities of intake air and residual gas for each cylinder to the corresponding desired amount of intake air and residual gas;

means for determining correction increments for each cylinder; and means for modifying the correction values in the correction memory of the on-board computer with the correction increments.

* * * * *